(12) United States Patent
Conrardy

(10) Patent No.: US 9,249,758 B2
(45) Date of Patent: Feb. 2, 2016

(54) PROPULSION ASSEMBLY AND METHOD

(71) Applicant: SNECMA, Paris (FR)

(72) Inventor: Jean Marie Conrardy, Courcelles sur Seine (FR)

(73) Assignee: SNECMA, Paris (FR)

( * ) Notice: Subject to any disclaimer, the term of this patent is extended or adjusted under 35 U.S.C. 154(b) by 712 days.

(21) Appl. No.: 13/771,562

(22) Filed: Feb. 20, 2013

(65) Prior Publication Data

US 2014/0325958 A1    Nov. 6, 2014

(30) Foreign Application Priority Data

Feb. 21, 2012 (FR) ...................................... 12 51575

(51) Int. Cl.
*F02K 9/48* (2006.01)
*F02K 7/18* (2006.01)
*F02K 9/52* (2006.01)

(52) U.S. Cl.
CPC ... *F02K 9/48* (2013.01); *F02K 7/18* (2013.01); *F02K 9/52* (2013.01)

(58) Field of Classification Search
CPC ............... F02K 9/42; F02K 9/46; F02K 9/48; F02K 9/52; F02K 7/18
USPC ........... 60/224, 246, 221, 222, 257, 259, 205, 60/217
See application file for complete search history.

(56) References Cited

U.S. PATENT DOCUMENTS

| | | | |
|---|---|---|---|
| 3,085,393 A * | 4/1963 | Hamlin, Jr. ..................... | 60/211 |
| 3,176,464 A * | 4/1965 | Meyer et al. .................... | 60/233 |
| 3,635,030 A | 1/1972 | Schubert et al. | |
| 6,293,091 B1 | 9/2001 | Seymour et al. | |
| 6,915,627 B2 * | 7/2005 | Calabro .......................... | 60/258 |
| 2005/0016157 A1 | 1/2005 | Okamoto et al. | |
| 2009/0113873 A1 | 5/2009 | Tweeton | |
| 2011/0173985 A1 | 7/2011 | Peyrisse et al. | |

FOREIGN PATENT DOCUMENTS

WO    2010/004232 A1    1/2010

OTHER PUBLICATIONS

French Preliminary Search Report issued Jan. 15, 2013, in Patent Application No. FR 1251575, filed Feb. 21, 2012 (with English Translation of Category of Cited Documents).

* cited by examiner

*Primary Examiner* — Steven Sutherland
(74) *Attorney, Agent, or Firm* — Oblon, McClelland, Maier & Neustadt, L.L.P.

(57) ABSTRACT

The invention relates to the field of aerospace propulsion, and more particularly to a propulsion assembly having at least one channel defined by an inner wall and an outer wall, the channel presenting an inlet opening and an outlet opening, the assembly including a plurality of rocket engines oriented axially in the channel and forming ejectors for accelerating a flow of air in the channel to supersonic speed. Downstream from the outlet opening from the channel, the inner wall forms a single expansion ramp nozzle. The invention also provides an aerospace craft and a method of propulsion using such a propulsion assembly.

11 Claims, 4 Drawing Sheets

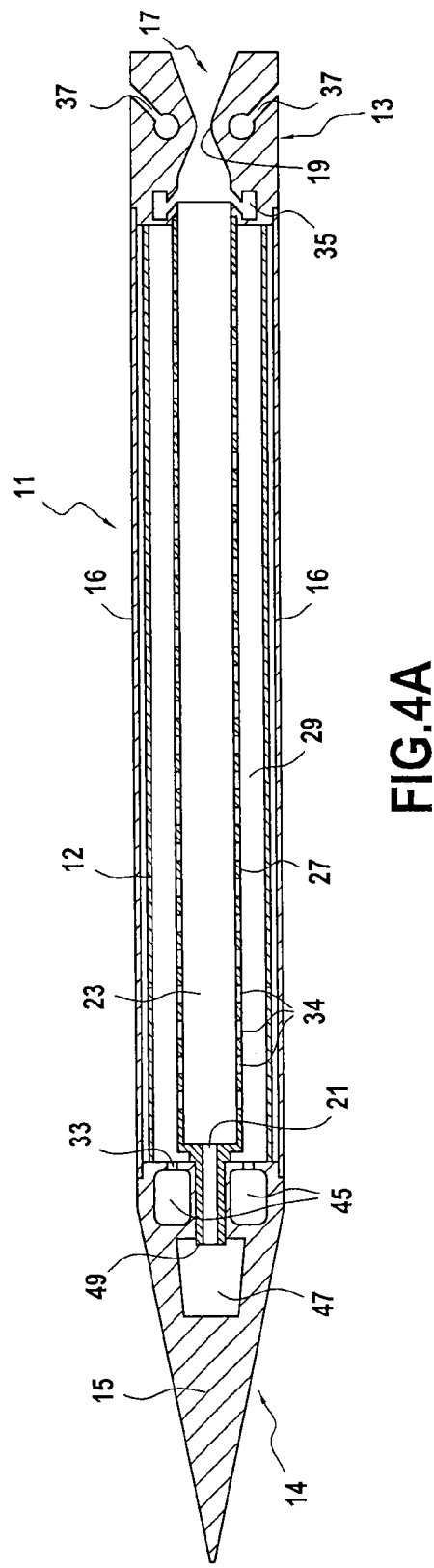
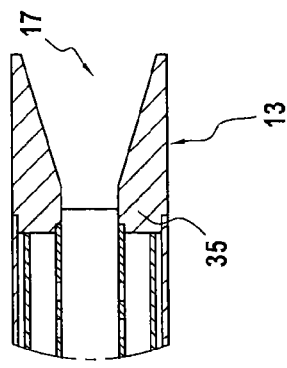
FIG. 4A
FIG. 4B

PROPULSION ASSEMBLY AND METHOD

BACKGROUND OF THE INVENTION

The present invention relates to jet propulsion, and in particular to a propulsion assembly capable of operating both in an atmospheric mode and in an exoatmospheric mode.

In the field of chemical jet thrusters, a distinction is drawn between rocket engines in which thrust is generated by the expansion of gas produced by a chemical reaction of one or more propellants, and air-breathing thrusters in which the thrust is generated by expanding gas produced by combustion of a fuel in air.

Rocket engines are normally non-air-breathing, and they have the particular advantage of being capable of operating even outside the Earth's atmosphere. Nevertheless, in order to feed them, it is necessary to carry a greater weight of propellant. By using ambient air for propulsion, air-breathing thrusters can carry a smaller weight, but they cease to operate as soon as the ambient density of oxygen drops below a certain threshold. In addition, among air-breathing jet thrusters, turbojets present a very high degree of mechanical complexity and are very difficult to adapt to hypersonic speeds. Ram jets, in which ambient air is compressed by the relative speed of the thruster, are simpler and are better adapted to very high speeds than turbojets, but they need initially to be propelled by other means up to a starting speed.

As means for performing this initial acceleration of ram jets, proposals have been made in particular to use rocket engines. In particular, using the concept known as "air-augmented" combustion, a rocket engine and a stream of air are combined in such a manner that in an air-breathing mode, combustion of at least one propellant of the rocket engine is increased by the air flowing in the air flow. A first example of an air-augmented combustion propulsion assembly was the solid propellant GNOM concept put forward in the Soviet Union in the 1960s. Another example was the American liquid propellant GTX project, which nevertheless did not advance beyond the study stage.

In patent application FR 2 933 744, another propulsion assembly of that type is disclosed, comprising a channel defined by an inner wall and an outer wall, and presenting an inlet opening and an outlet opening, together with a plurality of masts, each mast connecting together said inner and outer walls and each having rocket engines oriented in an axial direction. In that propulsion assembly, the rocket engines act as ejectors driving a stream of air to flow along the channel, and by injecting a fuel-rich gas into that stream of air, postcombustion is facilitated downstream from the masts.

Nevertheless, that propulsion assembly is designed solely for propulsion in the Earth's atmosphere, and it is not suitable for exoatmospheric propulsion. In order to enable propulsion gas to expand into the vacuum of space, exoatmospheric jet thrusters normally require nozzles of very large outlet section, which is difficult to make compatible with the configuration of the FR 2 933 744 propulsion assembly. In addition, cooling the throat of such a nozzle can present major technical obstacles.

OBJECT AND SUMMARY OF THE INVENTION

The invention thus seeks to propose a propulsion assembly that is capable of operating in the atmosphere in air-augmented combustion rocket mode, and that enables a high level of thrust to be obtained on takeoff in order to pass quickly through the dense layers of the atmosphere with limited consumption of on-board oxidizer.

In at least one embodiment, this object is achieved by the fact that it includes rocket engines forming ejectors for accelerating to supersonic speed a flow of air in a channel having an inner wall that forms a single expansion ramp nozzle downstream from the outlet end of the channel. The term "single expansion ramp nozzle" is used to mean a supersonic expansion nozzle that is open on one side, thus confining the flow of propellant gas in a longitudinal plane of the nozzle beside only an inner surface formed by said inner wall. The nozzle is open on the opposite side, thereby enabling the expansion of the propulsion gas to adapt to the external pressure. Thus, the nozzle may provide propulsion that is more efficient than that of conventional non-variable nozzles over a wider range of altitudes.

Since the flow of air reaches a supersonic speed inside the channel, under drive from the ejectors, the nozzle does not require a throat, thereby reducing the thermal stress on the propulsion assembly. Furthermore, with this throat-less nozzle and because of the rocket engines installed in the channel, the propulsion assembly is also capable of functioning as a rocket engine in an exoatmospheric mode.

In another aspect, the propulsion assembly includes turbopumps for feeding oxidizer and fuel, which turbopumps are situated axially to the rear of said outlet opening of the channel on an inside of said inner wall, together with a gas generator for actuating the turbopumps. This rear positioning of the turbopumps makes it possible to avoid cavitation problems without needing to use booster pumps, because of the pressure that is exerted by the propellant fluid columns upstream from the turbopumps during the acceleration of the propulsion assembly or when in a vertical launch position. The term "turbopumps" is used in the present context to mean pumps that are coupled to a common turbine or to separate turbines and that are actuated by the expansion of gas produced by the gas generator in order to pump the various propellants. In particular, the propellants may be cryogenic, and more specifically liquid hydrogen and liquid oxygen, thus making it possible to generate a gas mixture that is substantially soot-free at a temperature that is compatible with conventional materials, and thus being suitable for use in cooling the inner wall of the channel and also the concave wall of the single expansion ramp nozzle by means of a fluid film. The gas generator may also be configured to generate a fuel-rich gas mixture for feeding said rocket engines and/or a pervious screen after actuating said turbopumps. In this way, the propulsion assembly enables combustion to be staged, whereby the mixture coming from a gas generator can be used directly for feeding fuel for the combustion in the rocket engines, and also, in atmospheric, air-augmented combustion mode, for post-combustion in the channel.

An additional advantage of single-expansion ramp nozzles is that their shape gives easier access to the rear of the propulsion assembly than is possible with conventional nozzles that have a bell-shaped diverging portion. Thus, with the turbopumps situated to the rear of the propulsion assembly, the assembly may also include a ground-to-vehicle interface situated at the rear end of the propulsion assembly and suitable for receiving a delivery of external energy for starting said turbopumps. In particular, said interface may be suitable for receiving a flow of pressurized gaseous fuel for actuating said turbopumps on starting. Nevertheless, other starting systems and appropriate connectors could be envisaged as alternatives.

In addition, in order to cool the walls, at least a portion of said inner and outer walls may form a pervious screen for passing the fuel-rich pressurized gas. The term "pervious screen" is used in the present context to designate any wall configured to allow a fluid to pass through a multitude of perforations distributed over its entire area. Such a pervious screen may be constituted by a material that is porous, or by a wall that is perforated by small-diameter holes. This arrangement thus serves to providing cooling by transpiration or effusion, with a protective fluid film being formed. A fluid film cooling the inner wall in the channel may be extended so that it also cools the surface of the single-expansion ramp nozzle. This also makes it possible to cope with certain drawbacks of nozzles of that type, and in particular difficulties associated with cooling them.

The channel may in particular be annular. This provides a propulsion assembly having a toroidal fluid nozzle that is suitable for being incorporated in an aerospace craft of small frontal area. Nevertheless, other configurations may be envisaged as alternatives, such as for example a propulsion assembly having a channel of rectangular section and a linear fluid nozzle.

In addition, the propulsion assembly may include a plurality of masts, each connecting together said inner and outer walls and each having said rocket engines incorporated therein, so as to minimize the obstruction ratio in the stream of air in the channel.

In addition, each of said rocket engines may comprise an annular body provided internally with a pervious-screen-forming coaxial wall defining an annular fuel-injection zone that extends over the major fraction of the length of said annular body, and an oxidizer injector opening out axially into the inside of said pervious screen close to its front end. This procures rocket engines of small cross-section suitable in particular for being incorporated in masts of small frontal area, so as to limit opposition to the flow of the stream of air in the channel.

In addition, the propulsion assembly may also include at least one flap for closing the inlet opening of the channel, serving in particular to increase thrust during an exoatmospheric stage by the action of the pressure generated at the outlets from the rocket engines in the channel, and also serving to protect the propulsion assembly during re-entry into the atmosphere.

The invention also provides an aerospace craft including such a propulsion assembly, and a propulsion method in which, in an air-augmented combustion mode, a plurality of rocket engines forming ejectors accelerate a flow of air to supersonic speed in a channel defined by an inner wall and an outer wall and presenting an inlet opening and an outlet opening, said supersonic flow of air contributing to post-combustion downstream from the rocket engines and expanding in a single-expansion ramp nozzle formed by said inner wall downstream from the outlet opening.

BRIEF DESCRIPTION OF THE DRAWINGS

The invention can be well understood and its advantages appear better on reading the following detailed description of two embodiments shown as non-limiting examples. The description refers to the accompanying drawings, in which:

FIG. 4A is a diagrammatic longitudinal section view of a rocket engine of the FIG. 1 propulsion assembly;

FIG. 4B is a diagrammatic longitudinal section view of a variant of the FIG. 3A rocket engine.

DETAILED DESCRIPTION OF THE INVENTION

Figure 1:
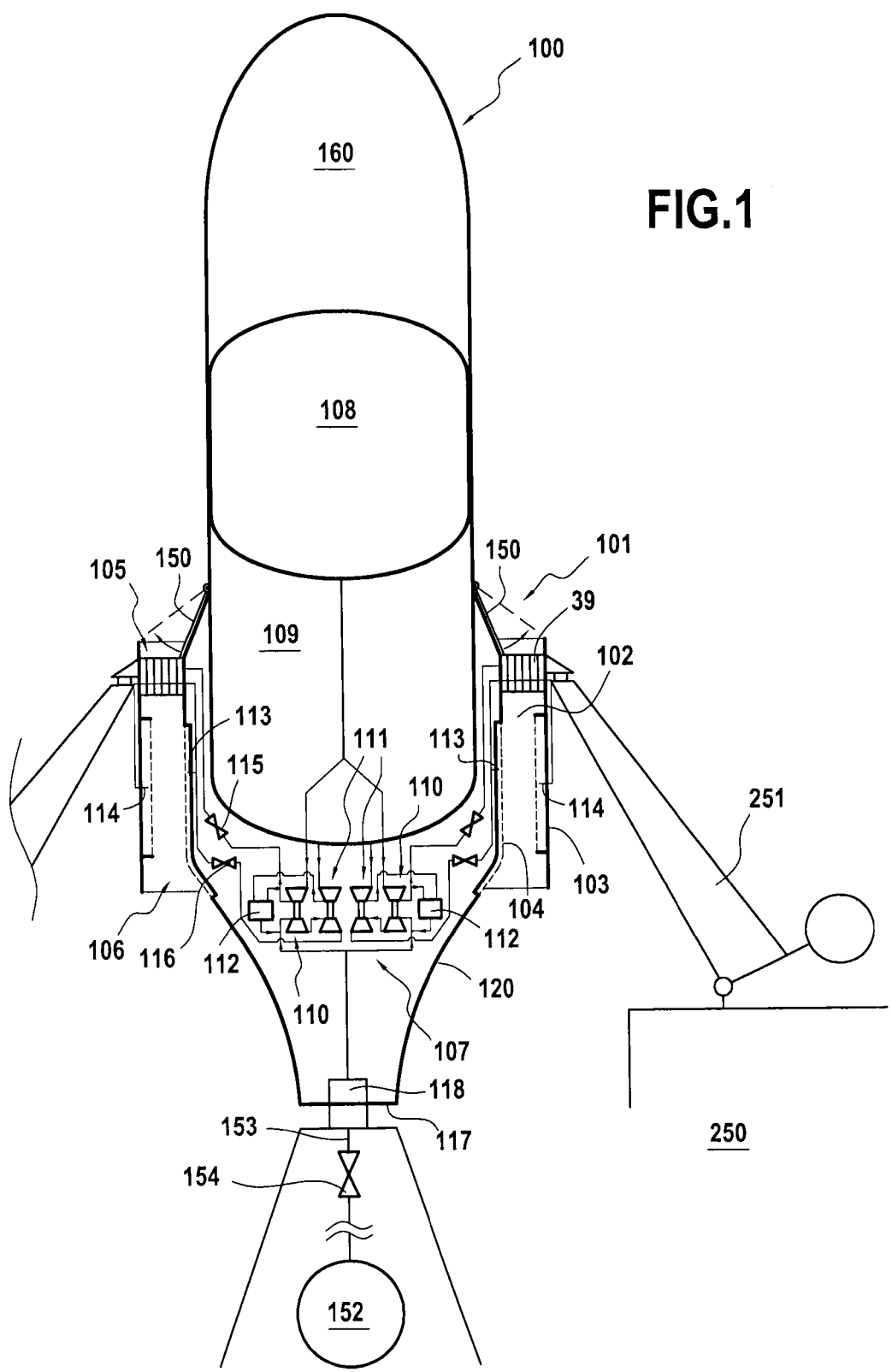
FIG. 1 is a diagrammatic longitudinal section view of a aerospace craft with a propulsion assembly in accordance with a first embodiment.
Figure 2:
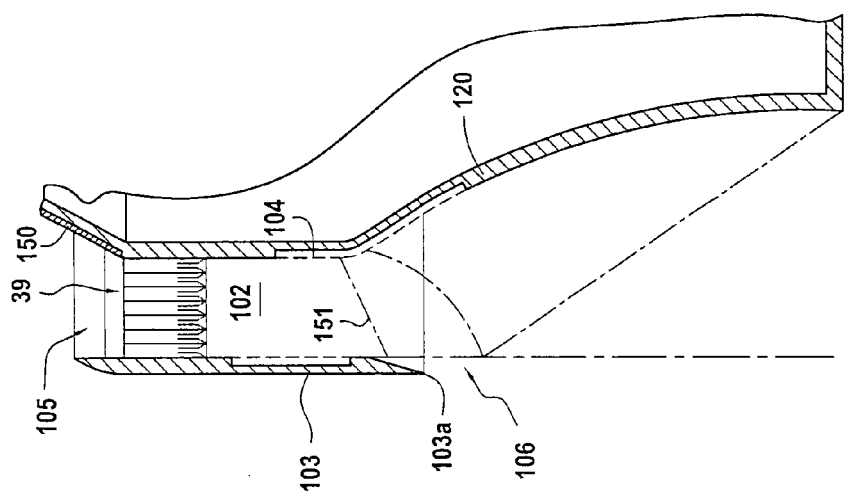
FIG. 2 is a detail view of the propulsion assembly of the FIG. 1 aerospace craft.

An aerospace craft 100 with a propulsion assembly 101 in accordance with a first embodiment of the invention is shown in FIGS. 1 and 2. This aerospace craft 100 may be a single-stage aerospace craft having a payload in a front portion 160, as shown, but it could equally well constitute merely one stage of a multi-stage craft, and in particular it could constitute the first stage. In this aerospace craft 100, the propulsion assembly 101 has a channel 102 defined by an outer wall 103 and an inner wall 104, and presenting an inlet opening 105 with closure flaps 150 and an outlet opening 106. Thus, in atmospheric propulsion mode, a stream of air can flow in the channel 102 between the walls 103 and 104, from the inlet opening 105 to the outlet opening 106. The walls 103 and 104 are connected together by streamlined masts 39 incorporating rocket engines 11. The closure flaps 150 can then close the inlet opening 105, in particular in order to increase the thrust from the propulsion assembly 101 during an exoatmospheric stage by the action of the pressure generated at the outlets from the rocket engines 11 in the channel 102, and can protect the propulsion assembly 101 during re-entry into the atmosphere of the aerospace craft 100. The structure of the rocket engines 11 and of the masts 39 is described below. Downstream from the outlet opening 106 of the channel 102, the inner wall 104 forms a single-expansion ramp nozzle 120.

The propulsion assembly 101 also includes a propellant feed circuit 107 having a tank 108 of cryogenic liquid oxidizer, e.g. liquid oxygen, a tank 109 of cryogenic liquid fuel, e.g. liquid hydrogen or methane, turbopumps 110 and 111, and gas generators 112. The turbopumps 110 and 111 are arranged so as to be actuated by the gases produced by the gas generators 112. The first turbopumps 110 are arranged so as to pump the oxidizer towards the gas generators 112 and the rocket engines 11, while the second turbopumps 111 are arranged to pump the fuel to the gas generators 112. Although in the embodiment shown, each turbopump 110 and 111 has an individual turbine, the person skilled in the art can also envisage using a single turbine for actuating a plurality of pumps, including pumps for different propellants. The turbopumps 110 and 111 are situated at the rear of the propulsion assembly 101 in the truncated cone of the nozzle 120.

The feed circuit 107 is configured so as to feed the gas generators 112 with excess fuel and thus produce in the gas generators 112 a fuel-rich mixture of hot gases that, after expanding in the turbines of the turbopumps 110 and 111, serves to feed the rocket engines 11. The feed circuit 107 also has valves 115 and 116 for regulating the respective flow rates of oxidizer and fuel-rich mixture as delivered to the rocket engines 11 of each mast 39, thus making it possible to supply different flow rates to each mast in order to control not only the total thrust, but also to steer the thrust.

The channel 102 and the nozzle 120 are shown in greater detail in FIG. 2. As shown in this figure, the inner wall 104 begins to diverge from the outer wall 103 a little upstream from its trailing edge 103a, in such a manner that the outer wall 103 can reflect the first expansion waves 151 of the supersonic flow leaving the channel 102 via its outlet opening 106.

The feed circuit 107 also has branch connections 113 and 114 leading respectively to the inner wall 104 and the outer wall 103, which walls form pervious screens enabling the pressurized gas to transpire through the wall and form a fluid film adjacent to the walls 104 and 103. In particular, the inner wall 104 may form a pervious screen between the masts 39 and the outlet opening 106 from the channel 102 not only to provide it with thermal protection, but also to provide additional fuel for post-combustion in the channel 102 downstream from the masts 39. In the embodiment shown, the inner wall 104 also forms a pervious screen downstream from the outlet opening 106 so as to continue to provide the nozzle 120 with thermal protection.

In FIG. 1, the aerospace craft 100 is shown in a vertical position for launching from a launch pad 250 having arms 251 that are fastened to the outer wall 103 prior to launch, and that can be released to pivot away from the aerospace craft 100 at the time of launch. At the rear end 117 of the propulsion assembly 108, the assembly also includes a ground-to-vehicle interface 118 connected to the turbines of the turbopumps 110 and 111 and suitable for being connected via a duct 153 in the launch pad 250 to a tank of pressurized gaseous oxidizer 152 in order to start the turbopumps 110 and 111 when launching the aerospace craft 100. For safety reasons, the tank 152 may be situated remote from the launch pad 250, and the duct 153 may include safety valves 154 to stop the flow of pressurized gaseous oxidizer 152 immediately after the turbopumps 110 and 111 have started.

Figure 3B:
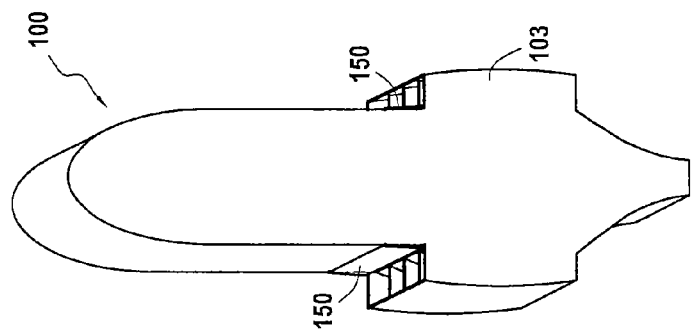
FIG. 3B is a diagrammatic perspective view of a aerospace craft with a propulsion assembly in accordance with a second embodiment.
Figure 3A:
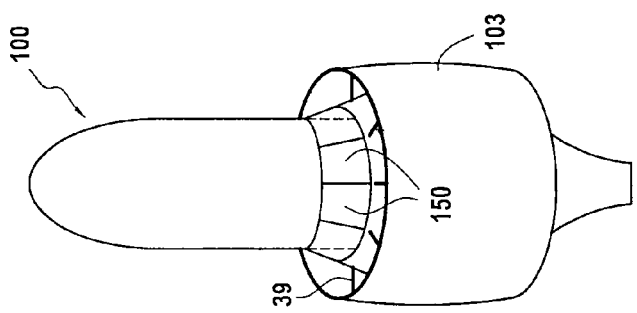
FIG. 3A is a diagrammatic perspective view of the FIG. 1 aerospace craft.

In this first embodiment, the propulsion assembly 101 is axisymmetric, as shown in FIG. 3A. Thus, the channel 102 is annular and the nozzle 120 is a nozzle of toroidal type. Nevertheless, other alternative shapes may be envisaged. For example, in a second embodiment shown in FIG. 1B, the propulsion assembly 101 has two channels 102 of rectangular section, each having a nozzle 120 of linear type.

Figure 5:
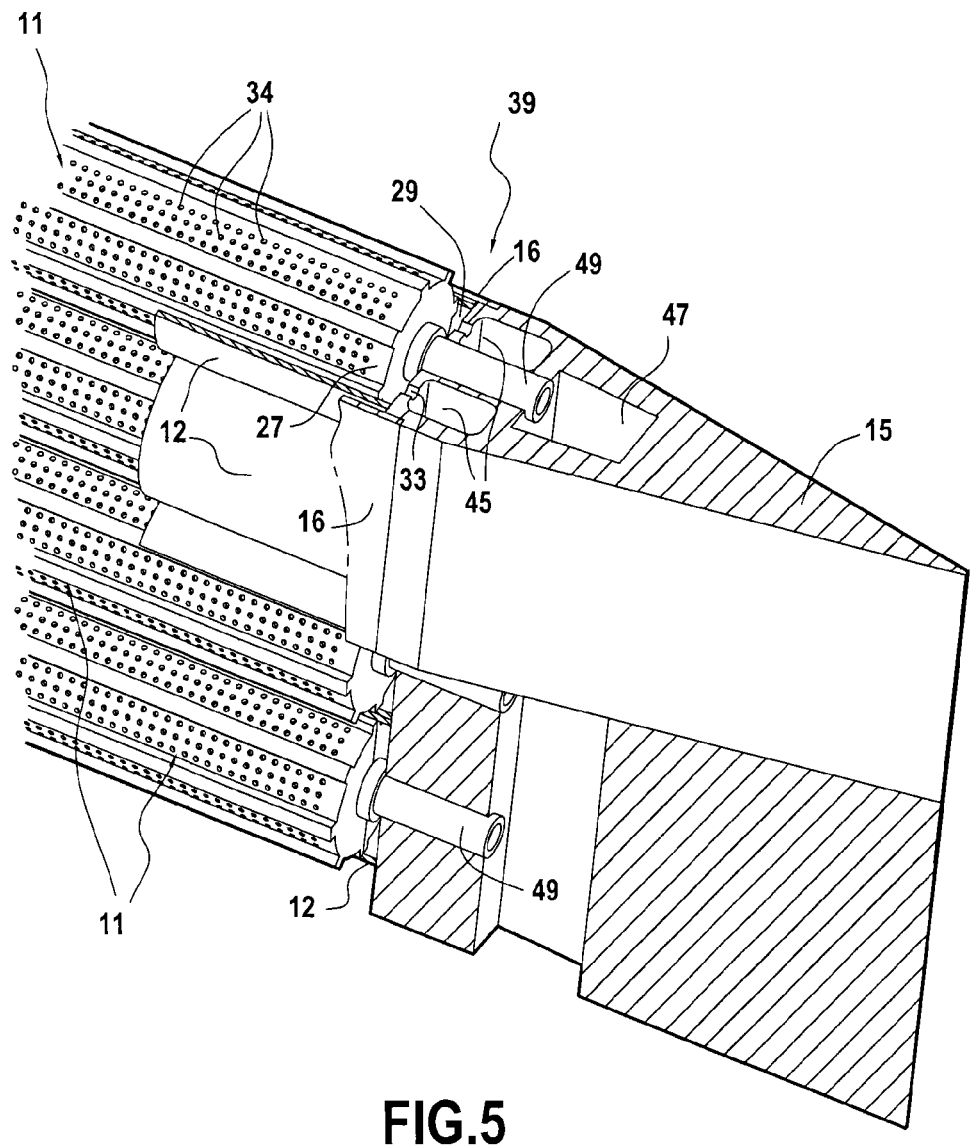
FIG. 5 is a cutaway detail view in perspective and in section of the front portion of a mast of the propulsion assembly of FIG. 1.

The structure of the rocket engines 11 is shown in detail in FIGS. 4A and 5. Each rocket engine 11 comprises a generally cylindrical body 12 having a streamlined nose 15 at the front and an exhaust nozzle 17 including a throat 19 forming a flow constriction in order to increase the speed at which gas is ejected. An oxidizer injector 21 is arranged axially at the front and opens out into a combustion chamber 23 that is generally cylindrical in this example and that extends between the injector orifice 21 (at the front) and the nozzle 17 (at the rear). The wall 27 of the combustion chamber 23 is coaxial with the wall of the body 12. Between them, these two walls define a cylindrical annular space 29. A plurality of similar rocket engines 11 are associated in each mast 39, the rocket engines being arranged longitudinally side by side. Such a mast has a front block 14 that forms the nose 15 of all of the rocket engines, and a rear block 13 in which all of the exhaust nozzles 17 are incorporated. Two side plates 16 connect the front block 14 and the rear block 13 together. They contribute to fairing the mast 39 and they protect the bodies 12 of all of the rocket engines 11.

The wall 27 of the combustion chamber of the rocket engine 11 is arranged as a pervious screen and the space 29 constitutes an annular fuel injection zone that thus extends over the major fraction of the length of the body. A fuel injector 33 is situated at the front. It communicates with the space 29. The pervious screen of the wall 27 may be constituted by a material that is porous or by a cylinder that is perforated by small-diameter holes 34, as shown. This arrangement serves to cool the wall by transpiration with a protective film of fuel being formed all along the inside face of the pervious screen, thereby enabling the wall 27 to survive in spite of the high temperature that exists in the combustion chamber 23.

The distribution of these perforations may vary along the combustion chamber in order to obtain a film that is sufficient, including for protecting the throat 19. Advantageously, additional means 35 are provided for injecting fuel-rich gas. These means open out into the combustion chamber immediately in front of the throat 19 in order to improve the effectiveness of the protective film flowing along the wall of the throat.

In addition, channels 37 are arranged in the available space around the throat 19 for passing and injecting fuel. The purpose and the operation of these channels 37 are described below.

As shown in FIGS. 4A and 5, the structure of such a rocket engine 11 is advantageous because of its small diameter, thereby making it possible to provide masts 39 that are narrow and thus obtain a close-packed grid of masts presenting a small obstruction ratio for the stream of air in the channel 102. As shown, the rocket engines 11 are arranged side by side in masts, each mast 39 extending across the channel 102. The streamlined nose 15 is common to all of the rocket engines 11 in a given mast 39. It is generally in the form of a forwardly-tapering blade and it contains a channel 45 for feeding the fuel-rich gas and a channel 47 for feeding oxidizer. The channel 45 for feeding fuel-rich gas communicates with all of the annular spaces 29, while the channel 47 for feeding oxidizer communicates with all of the combustion chambers 23 via parallel ducts 49 opening out respectively axially at the fronts of the combustion chambers 23.

A plurality of masts 39 can thus be arranged in the channel 102 with the masts being spaced apart from one another sufficiently to form a grid that presents a relatively low obstruction ratio to the flow. In operation, the fuel-rich gas film coming from the additional injection means 35 and the channels 37 is burned in post-combustion in the channel 102 downstream from the masts 39. Nevertheless, since the fuel-rich gas is also injected downstream from the masts 39, it is possible, in a variant that is shown in FIG. 4B, to omit the additional injector means 35 and/or the channels 37 from the rocket engines 11.

Furthermore, in the rocket engine 11 shown in FIG. 4B, the permeability of the pervious screen of the wall 27 varies along the combustion chamber in such a manner as to create a thermal throat that makes it possible to do without any physical constriction in the diameter of the nozzle 17 so as to transition from a subsonic regime to a supersonic regime in the flow of combustion gas through the nozzle 17. Such a rocket engine 11 fed, i.e. an engine with a mixture of propellant and including a tubular body 12 provided internally with a pervious-screen-forming coaxial wall 27 that defines an annular fuel-injection zone 29 extending over the major fraction of the length of said body and an oxidizer injector 21 opening out axially into the inside of said pervious screen in the vicinity of its front end, and in which the permeability of the pervious screen varies along the combustion chamber in order to create a thermal throat for the nozzle 17, may also be adapted to other uses without being necessarily associated with the other characteristics of the embodiment shown.

The propulsion assembly 101 is suitable for operating in two successive modes. In launch mode, the feed circuit 107 feeds oxidizer and fuel-rich gas for an air-breathing combustion in the rocket engines 11, which operate as ejectors for accelerating the flow of air in the channel 102. The feed circuit 107 provides a large fraction of fuel-rich gas, in particular through the additional injector means 35, the channels 37, and/or the pervious screens in the inner and outer walls 104 and 103, so that the supersonic flow of air also contributes to feeding air-breathing post-combustion of this fuel-rich gas in the channel 102 downstream from the masts 39. Also, in an exoatmospheric mode, the closure flaps 150 are moved to close the inlet opening 105 and the propulsion assembly 101 makes use only of the oxidizer carried on board, which is injected into the rocket engines 11 through the injectors 33. Thus, the thrust of the propulsion assembly 101 is increased in the exoatmospheric stage by the action of the pressure generated at the outlet from the rocket engines 11 in the channel 102. At the end of a mission, during re-entry of the aerospace craft 100 into the atmosphere, the closure flaps 150 serve to protect the propulsion assembly 101 from aerodynamic and thermal loading associated with re-entry.

Although the present invention is described with reference to specific embodiments, it is clear that various modifications and changes may be made to those embodiments without going beyond the general ambit of the invention as defined by the claims. In particular, the use of rocket engines with thermal throat nozzles of the type shown in FIG. 4B may be considered independently of the other arrangements set out in the description. Furthermore, the individual characteristics of the various embodiments mentioned may be combined to produce additional embodiments. Consequently, the description and the drawings should be considered as being illustrative rather than restrictive.

What is claimed is:

1. A propulsion assembly comprising at least:
   a channel defined by an inner wall and an outer wall and presenting an inlet opening and an outlet opening, said inner wall forming, downstream from said outlet opening of the channel, a single expansion ramp nozzle;
   a plurality of rocket engines oriented in an axial direction in the channel and forming ejectors for accelerating a flow of air in the channel to a supersonic speed;
   turbopumps for feeding oxidizer and fuel, said turbopumps being situated axially downstream from said outlet opening of the channel on the inside of said inner wall; and
   a gas generator for actuating said turbopumps.

2. A propulsion assembly according to claim 1, wherein at least portions of said inner and outer walls form pervious screens for passing the pressurized fuel-rich gas.

3. A propulsion assembly according to claim 2, wherein said gas generator is configured to generate a fuel-rich gas mixture for feeding said rocket engines and/or said pervious screen after actuating said turbopumps.

4. A propulsion assembly according to claim 1, wherein said channel is annular.

5. A propulsion assembly according to claim 1, further including a plurality of masts, each connecting together said inner and outer walls, and having said rocket engines incorporated therein.

6. A propulsion assembly according to claim 1, wherein said propellants are cryogenic.

7. A propulsion assembly according to claim 1, including a ground-to-vehicle interface in a downstream end of the propulsion assembly that is suitable for receiving a delivery of external energy for starting said turbopumps.

8. A propulsion assembly according to claim 7, wherein said ground-to-vehicle interface is suitable for receiving a flow of pressurized fuel for actuating said turbopumps on starting.

9. A propulsion assembly according to claim 1, wherein each of said rocket engines comprises:
   a tubular body provided internally with a coaxial wall forming a pervious screen defining an annular fuel-injection zone that extends over the major fraction of the length of said tubular wall; and
   an oxidizer injector opening out axially to the inside of said pervious screen close to its front end.

10. A propulsion assembly according to claim 1, further including at least one flap for closing the inlet opening of the channel.

11. An aerospace craft including a propulsion assembly according to claim 1.

* * * * *